US008922337B2

(12) United States Patent
Fukushima

(10) Patent No.: US 8,922,337 B2
(45) Date of Patent: Dec. 30, 2014

(54) DEVICE USE RESTRICTING SYSTEM

(75) Inventor: Takafumi Fukushima, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 992 days.

(21) Appl. No.: 12/561,200

(22) Filed: Sep. 16, 2009

(65) Prior Publication Data
US 2010/0073127 A1 Mar. 25, 2010

(30) Foreign Application Priority Data
Sep. 24, 2008 (JP) .................................. 2008-244837

(51) Int. Cl.
*G06F 21/35* (2013.01)
(52) U.S. Cl.
CPC ..................................... *G06F 21/35* (2013.01)
USPC ........................................ 340/5.61; 340/10.4
(58) Field of Classification Search
CPC ..................................................... G06F 21/35
USPC ........ 340/5.6, 5.61, 5.64, 10.1; 713/185, 186; 235/382.5, 492
See application file for complete search history.

(56) References Cited

U.S. PATENT DOCUMENTS

| | | | |
|---|---|---|---|
| 2002/0059104 A1 | 5/2002 | Fukushima | |
| 2002/0162008 A1 | 10/2002 | Hill | |
| 2003/0226042 A1 | 12/2003 | Fukushima | |
| 2004/0230809 A1* | 11/2004 | Lowensohn et al. | 713/186 |
| 2004/0257202 A1 | 12/2004 | Coughlin et al. | |
| 2005/0040241 A1* | 2/2005 | Raskar | 235/492 |
| 2005/0235156 A1* | 10/2005 | Chen | 713/182 |
| 2005/0278547 A1 | 12/2005 | Hyndman et al. | |
| 2007/0043954 A1* | 2/2007 | Fox | 713/185 |
| 2007/0162597 A1 | 7/2007 | Tanaka et al. | |

FOREIGN PATENT DOCUMENTS

EP 1783695 A1 5/2007

OTHER PUBLICATIONS

Official Letter dated Apr. 17, 2012 from the European Patent Office for corresponding European Patent Application No. 09 170985.7-2212.

* cited by examiner

Primary Examiner — Edwin Holloway, III
(74) Attorney, Agent, or Firm — Patterson & Sheridan, LLP

(57) ABSTRACT

A device is provided with a reader/writer that wirelessly communicates with an RFID module in a con-contact manner that resides within a wireless communications area of the device, and an optical transmitter transmitting a signal receivable by the RFID module in an area in the vicinity of the device within the wireless communication area of the device, the signal receivable area being narrower than the wireless communication area. The device determines whether an ID of an RFID currently performing wireless-communication is stored in its storage as an authorized ID, or not. The optical transmitter initiates signal transmission on the condition of the determination that the corresponding ID is stored. Upon receipt of the signal from the optical transmitter by a photoreceptor, the RFID module wirelessly transmits an authentication request signal to the device. Having received the authentication request signal from the RFID module, the device authenticates the ID and authorizes the use of the device based on the establishment of the authentication. Thus, the use of the device by unspecified users can be excluded at a high ratio without impairing the convenience of users of the device.

10 Claims, 10 Drawing Sheets

DEVICE USE RESTRICTING SYSTEM

CROSS REFERENCE TO RELATED APPLICATION

This application is based upon and claims the benefit of priority from prior Japanese Patent Application No. 2008-244837 filed on Sep. 24, 2008, the contents of which are incorporated herein by reference.

FIELD OF THE INVENTION

The present invention relates to a device use restricting system that restricts the use of one or more devices shared by multiple users.

BACKGROUND OF THE INVENTION

For a method for restricting users of office automation equipment, such as a personal computer and complex equipment, and operational equipment such as a POS terminal and credit-service terminal, there are known a method of performing user authentication using a user specific ID and a password and a method of performing user authentication using biometrics information of a user. Recently, a method of restricting users by using an RFID is also known.

There is disclosed in Japanese patent publication No. 2931276 a user restricting system including an ID signal transmission unit and a use restriction release unit. Each of the users of the system carries an ID signal transmission unit, that is an aspect of an RFID module, and the use restriction release unit is provided in a device to which such user restriction is applied.

The ID signal transmission unit, provided with a transmitter and a receiver, transmits an ID code signal (ID) at a constant intensity. The use restriction release unit, also provided with a transmitter and a receiver, sends to the relative device a signal that releases the restriction of the use based on the ID code signal received by its receiver, and transmits a confirmation code signal having the identical code signal from its transmitter at a constant intensity.

If a distance between the relative two units are within a specified distance, the use restriction release unit is enabled to receive a signal from the ID signal transmission unit representing that the ID signal transmission unit has detected that the ID code signal received is its own. Upon receipt of this signal, the use restriction release unit transmits a confirmation code signal back to the ID signal transmission unit, and sends a use restriction release signal to an information processing apparatus. On the other hand, if a distance between the two units is more than the specified distance and thus a level of the signal to one unit from the other becomes lower than a predetermined level in the respective units, the use restriction release unit stops the transmission of the use restriction release signal.

Thus, if the distance between the relative two units is within the specified distance, the use restriction of the applicable device is released, while the use restriction becomes to function if the distance becomes more than the specified value.

In a device use restriction system using such an RFID module, the use restriction can be released as long as the RFID module resides within a range of a prespecified distance from a reader/writer provided in the applicable devices.

Herein, a problem is an area where the use restriction of the applicable device is released. If the area is too narrow, the use of the applicable device is forbidden when the user is positioned only a little apart from the applicable device, and thus the usage becomes inconvenient. On the contrary, if the area becomes too large, the use restriction can be released despite the situation that the user is far apart from the applicable device, and thus a fear of being used by unspecified persons arises.

SUMMARY OF THE INVENTION

The present invention has been made in view of the above circumstances. According to one aspect of the invention, there is provided a device use restricting system that can exclude use of unspecified persons at a high ratio without detracting the convenience of the users.

According to the present invention, there is provided a device use restricting system that restricts the use of a device to a user or users who each carry an RFID module, the system includes:

the device having, wireless communication means for performing wireless communication with the RFID module residing within a wireless communication area of the device in a non-contact manner;

transmission means for transmitting a signal receivable by the RFID module in an area in the vicinity of the device within the wireless communication area of the device, the signal receivable area by the RFID module being narrower than the wireless communication area;

authorization ID storage means for storing an ID of the RFID module carried by a user authorized to use the device; ID determining means for determining whether the ID of the RFID module currently performing wireless communication by the wireless communication means is stored by the authorization ID storage means; control means for controlling initiation of the signal transmission by the transmission means on the condition that the ID of the RFID module has been stored by the ID determining means;

authentication means, when having received an authentication request signal containing the ID of the RFID module from the ID module through the wireless communication means, for authenticating that the ID contained in the signal is the ID that is determined to be stored by the ID determining means and use authorization means for authorizing the use of the device on the condition that the authentication means authenticates that the ID contained in the authentication request signal is the ID that is determined to be stored by the ID determining means, and the RFID module including, reception means for receiving a signal from the transmission means; and authentication request means for wirelessly transmitting the authentication request signal in response to the reception of the signal by the reception means.

BRIEF DESCRIPTION OF THE DRAWINGS

These and other objects and advantages of this invention will become apparent and more readily appreciated from the following detailed description of the presently preferred exemplary embodiments of the invention taken in conjunction with the accompanying drawings wherein.

DETAILED DESCRIPTION OF THE INVENTION

Figure 1:
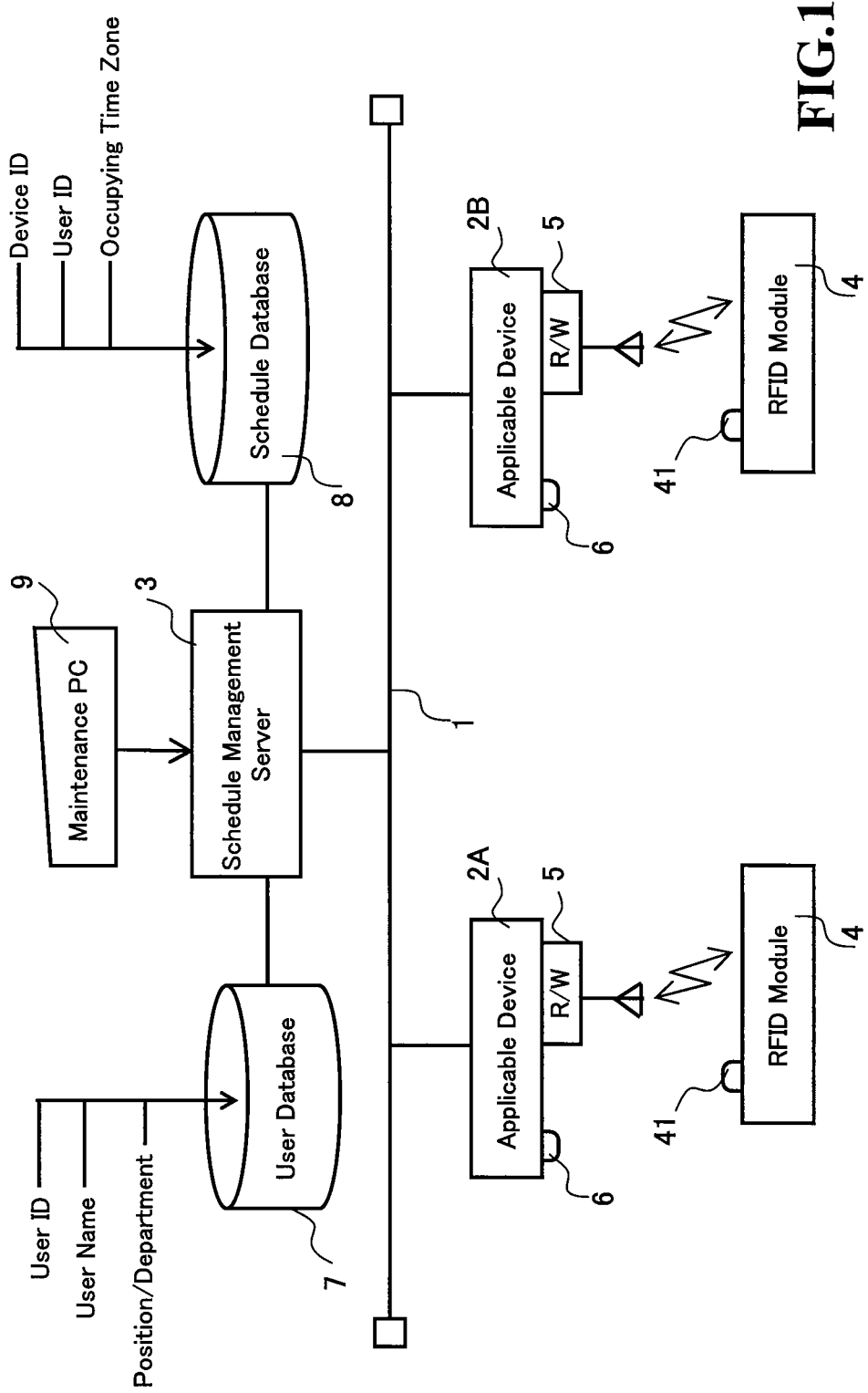
FIG. 1 is an overall view of a system according to an embodiment of the present invention.

Preferred embodiments of the present invention will now be described in more detail with reference to the accompanying drawings. However, the same numerals are applied to the similar elements in the drawings, and therefore, the detailed descriptions thereof are not repeated.

This embodiment is an example in which the present invention is applied to a system that restricts users of a device such as office automation equipment and operational equipment.

FIG. 1 illustrates an overall view of a system according to the present embodiment. A plurality of devices to which the user restriction is applied are connected to a schedule management server 3 via a communications line 1 such as a LAN (Local Area Network). FIG. 1 shows an example in which two sets of applicable devices 2A and 2B are used. There is attached to each of the applicable devices 2 a reader/writer 5 as a wireless communication means (interrogator) that wirelessly communicates with an RFID module 4 carried by each user. There is also provided in each of the applicable devices a light emitter 6 as a transmitting means for transmitting a signal that RFID module 4 can be received. The light emitted from light emitter 6 is received by a photo receptor 41 that is provided in RFID module 4 as a receiving means. An infrared emitting diode is used as light emitter 6, and a photo-detector is used as photo receptor 41.

Schedule management server 3 controls a user database 7 and a schedule database 8. In user database 7, there are registered user data such as a user name and a position each being related with the respective user's ID that is specifically provided for each user. Registered in schedule database 8 are schedule data such as a user ID of a user who has made a reservation for use of a relative device and a time zone to be used that are related to a device ID that identifies each of the applicable devices. The user data registered in user database 7 and the schedule data registered in schedule database 8 can be added, altered, and deleted via a maintenance PC 9 as needed.

Figure 2:
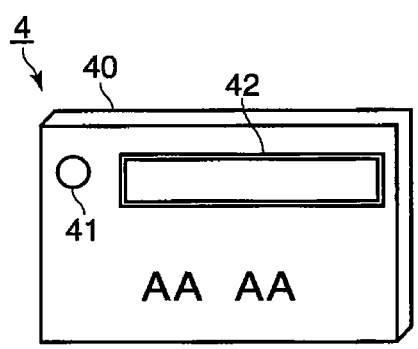
FIG. 2 is an external view of an RFID module according to the embodiment of the present invention.
Figure 3:
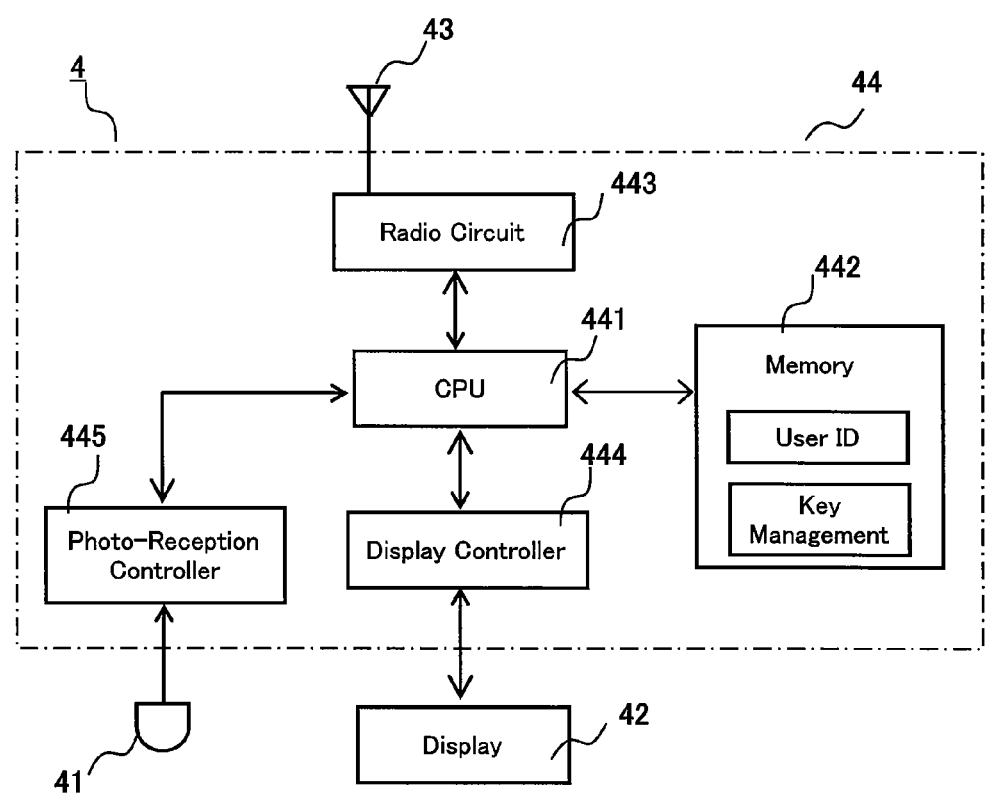
FIG. 3 is a block diagram of the RFID module according to the embodiment of the present invention.

RFID module 4 is formed so that the user can carry it, for example, as a nametag being attached to the chest at all times. FIG. 2 is an external view of RFID module 4. FIG. 3 is a block diagram of RFID module 4. In this example, RFID module 4 is provided with a photoreceptor 41 and a message display section 42 on the surface of a card-like main body 40 on which a user name XX is recorded. Main body 40 mounts an antenna 43 and an IC chip 44. IC chip 44 incorporates a CPU 441, a nonvolatile memory 442, radio circuit 443, a display controller 444, and a photo-reception controller 445. Memory 442 provides a user ID area where user IDs of users who use RFID module 4 are stored and a key management area where an encryption key and a decryption key are stored.

Radio circuit 443 has a power generation section, a demodulation section, and a modulation section. The power generation section supplies a power, which is obtained by rectifying and smoothing a radiowave received by antenna 43, to each of the sections of IC chip 44. The demodulation section demodulates the radiowave received by antenna 43 to send to CPU 441. The modulation section modulates data sent from CPU 441 to radiate it from antenna 43.

CPU 441 writes data demodulated by the demodulation section of radio circuit 443 to memory 442. CPU 441 also reads data from memory 442 and sends it to the modulation section of radio circuit 443. Display controller 444 displays a message on message display section 42 based on display data. Photo-reception controller 445 converts light received by photoreceptor 41 into an electrical signal and supplies it to CPU 441.

Figure 4:
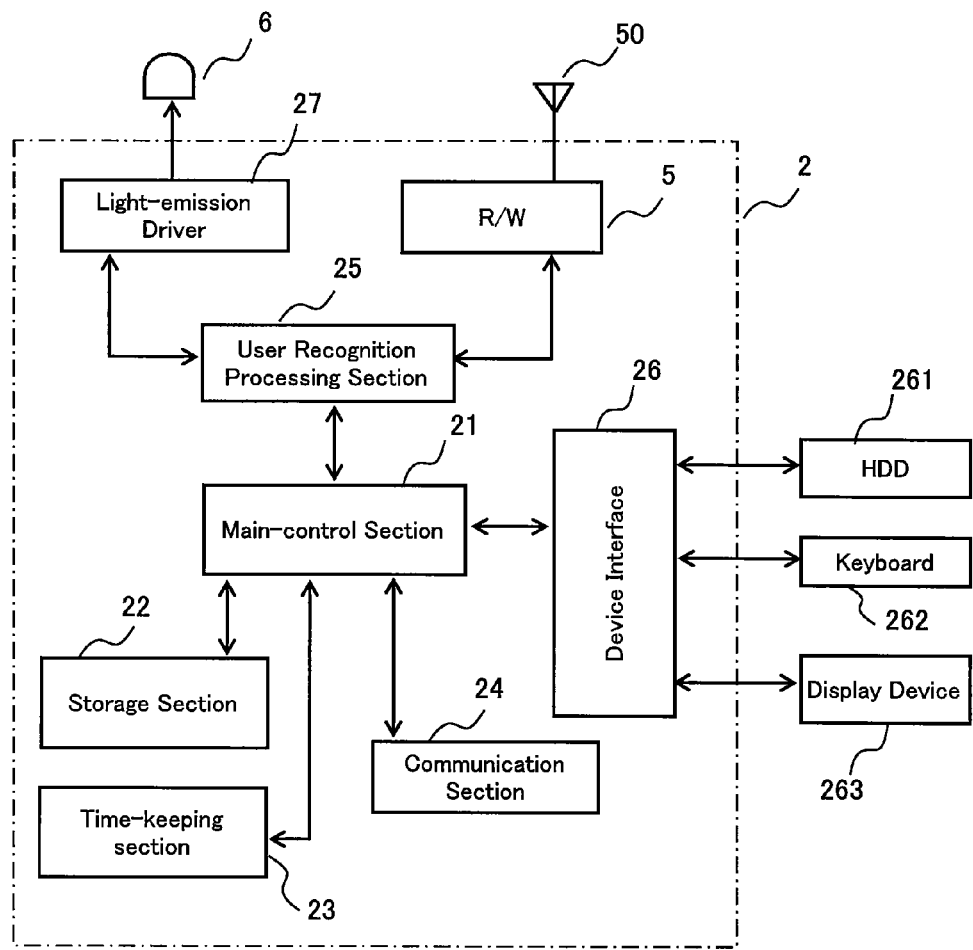
FIG. 4 is a block diagram of a device according to the embodiment of the present invention.

The respective applicable devices 2 (2A, 2B, . . . ) have basically the same structure. A structure of its principle part is shown in FIG. 4. Each device 2 includes a main-control section 21, a storage section 22, a time-keeping section 23, a communication section 24, a user recognition processing section 25, a device interface 26, and a light-emission driver 27. Storage section 22, time-keeping section 23, communication section 24, user recognition processing section 25, and device interface 26 are connected to main-control section 21. Connected to device interface 26 are various peripheral devices including an HDD (Hard Disk Drive) drive 261, a keyboard 262, a display 263. A reader/writer 5 and a light-emission driver 27 are connected to user recognition processing section 25. Light-emission driver 27 is connected to light emitter 6. Light emitter 6 uses an infrared light-emitting diode. Light-emission driver 27 outputs a pulse signal to light emitter 6 to emit light therefrom.

Figure 5:
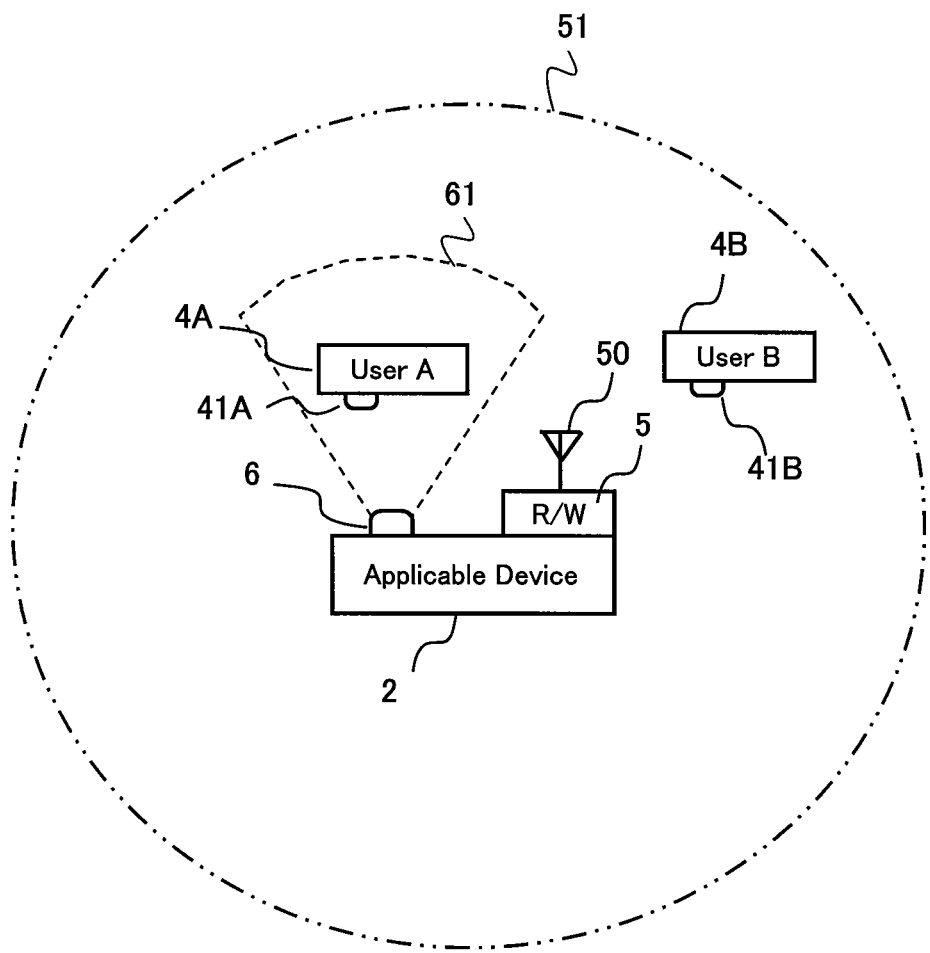
FIG. 5 is a schematic illustration illustrating a wireless communication area and an optical communication area according to the embodiment of the present invention.

Referring now to FIG. 5, a wireless communication area 51 by reader/writer 5 and a fan-like communication area 61 by light emitter 6 will be described. The circular area 51 indicated in chain double-dashed line represents a reachable area (wireless communication area) of a radiowave radiated from an antenna 50 of reader/writer 5. The fan-like communication area 61 indicated in dash line represents a reachable area (optical communication area) of light emitted from light emitter 6.

Since reader/writer 5 uses a UHF (ultra High Frequency) band as a radiowave frequency band, broad wireless communication area 51 of more than several meters from antenna 50 is attained. Reader/writers 5 in FIG. 5 are capable of wirelessly communicating with RFID modules 4A and 4B provided within wireless communication area 51. The frequency band of the radiowave can be arbitrarily selected as long as the communication is enabled at a longer distance than the communication distance achieved by light emitter 6.

On the contrary, the light emitted from light emitter 6 is as weak as the reachable distance is only several tens centimeters. Antenna 50 is mounted to device 2. Light emitter 6 is provided on the operating panel facing an operator of device 2. Accordingly, as can be seen from the illustration of FIG. 5, only photoreceptor 41A of RFID module 4A residing within optical communication area 61 in the vicinity of the relative device 2, which is narrower than wireless communication area 51, is enabled to receive the light from light emitter 6. On the other hand, photoreceptor 41B of RFID module 4B positioned outside of the optical communication area 61 is disabled to receive the light from light emitter 6. Incidentally, the size of optical communication area 61 is nearly the same as that of an operational area of device 2 by the user.

Now, returning to the description of device 2, communication section 24 is connected to communication line 1, and performs data communication with schedule management server 3 and other device 2 connected via communication line 1 under control of main-control section 21. Time-keeping section 23 (timekeeping means) keeps current date and time. Storage section 22, composed of a ROM (Read only Memory) and a RAM (Random Access Memory), functions as a storage area for programs and various data. Main-control section 21 composed mainly of a CPU (Central Processing Unit) controls the respective internal sections according to preset programs.

Figure 6:
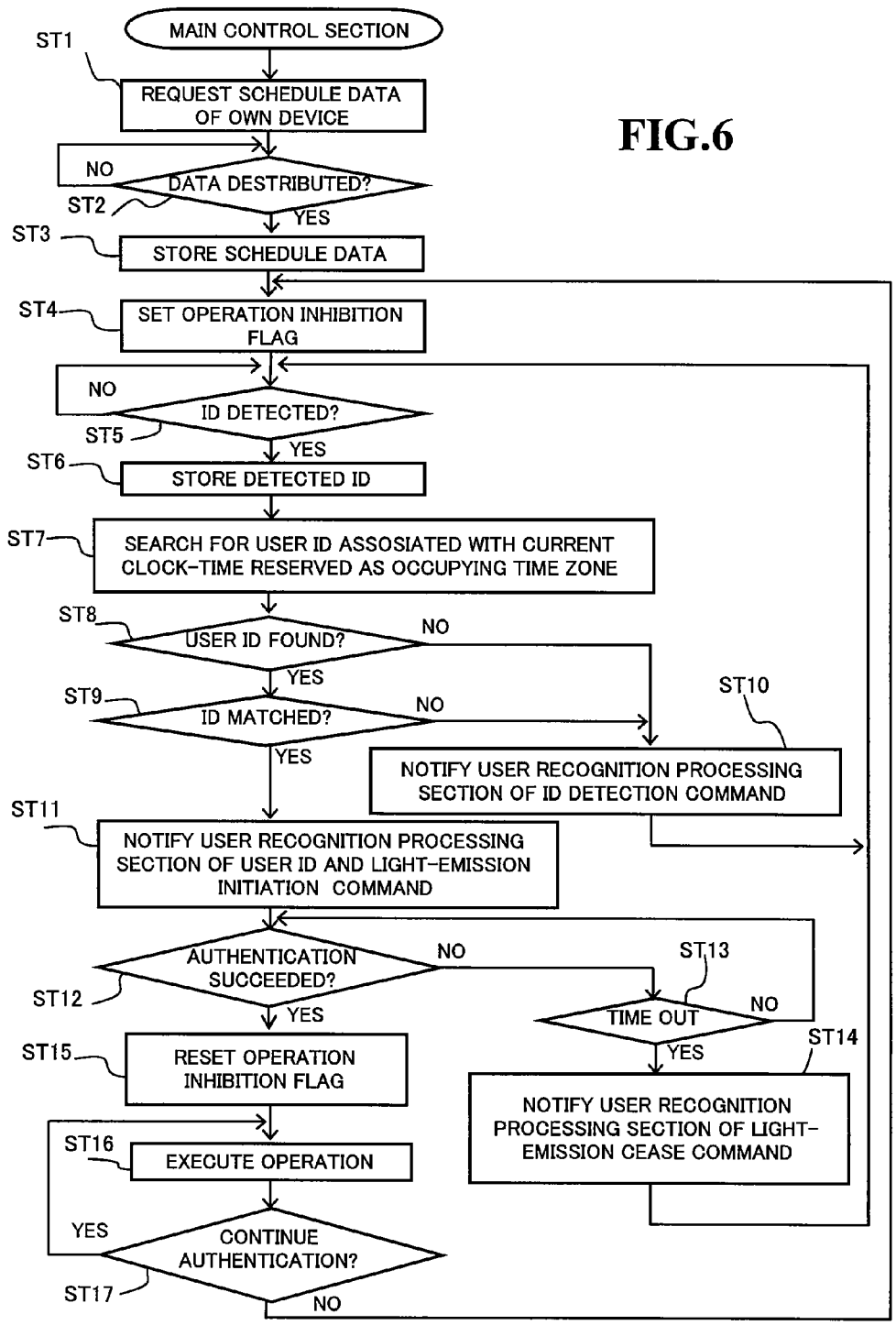
FIG. 6 is a flow chart illustrating the main-flow procedure executed by a main controller of the device according to the embodiment of the present invention.

In this embodiment, main-control section 21 executes the operations procedure illustrated in the flowchart of FIG. 6. In this connection, user recognition processing section 25 executes the operations procedure illustrated in the flowchart of FIG. 7. Furthermore, CPU 441 of RFID module 4 executes the operations procedure illustrated in the flowchart of FIG. 8. The usage restricting function of device 2 will be described below in reference to these flowcharts.

Upon initiation of a certain device 2, the main-control section 21 of the device 2 commences operations of the procedure illustrated in the flowchart of FIG. 6. First, in step ST1, the main-control section 21 sends a request command for schedule data of the own device to schedule management server 3 through communication section 24.

This request command includes a device ID that was previously assigned to that device. Schedule management server 3 searches a schedule database 8 for the device ID in the received command and extract all of the schedule data related to the relative device ID. Then, the schedule data is delivered to the device 2 of the request source via communication line 1.

Main-control section 21 of the relative device 2, which has sent the above request command in ST1, waits for the schedule data sent from schedule management server 3 in ST2. Having received the schedule data from schedule management server 3 though communication section 24 (YES, in ST2), main-control section 21 generates a schedule data file in which that schedule data is arranged in the order from the earliest starting time and stores the file in storage section 22 in ST3.

The schedule data includes a user ID of a user who reserved the use of the related device 2, as described earlier. Herein, storage section 22 functions as an authorized ID storage means that stores the ID of RFID module 4 that the user carries who is authorized to use the relative device 2. That is, storage section 22 performs as an authorization ID memory.

After storing the schedule data file in storage section 22 in ST3, main-control section 21 sets an operation inhibition flag in ST4. The operation inhibition flag is stored in storage section 22. With the operation inhibition flag being set, main-control section 21 prohibits inputting from the input section including a keyboard 28, a pointing device, a scanner, and a touch panel, among the peripheral devices connected to device interface 26 (input inhibition means).

Figure 7:
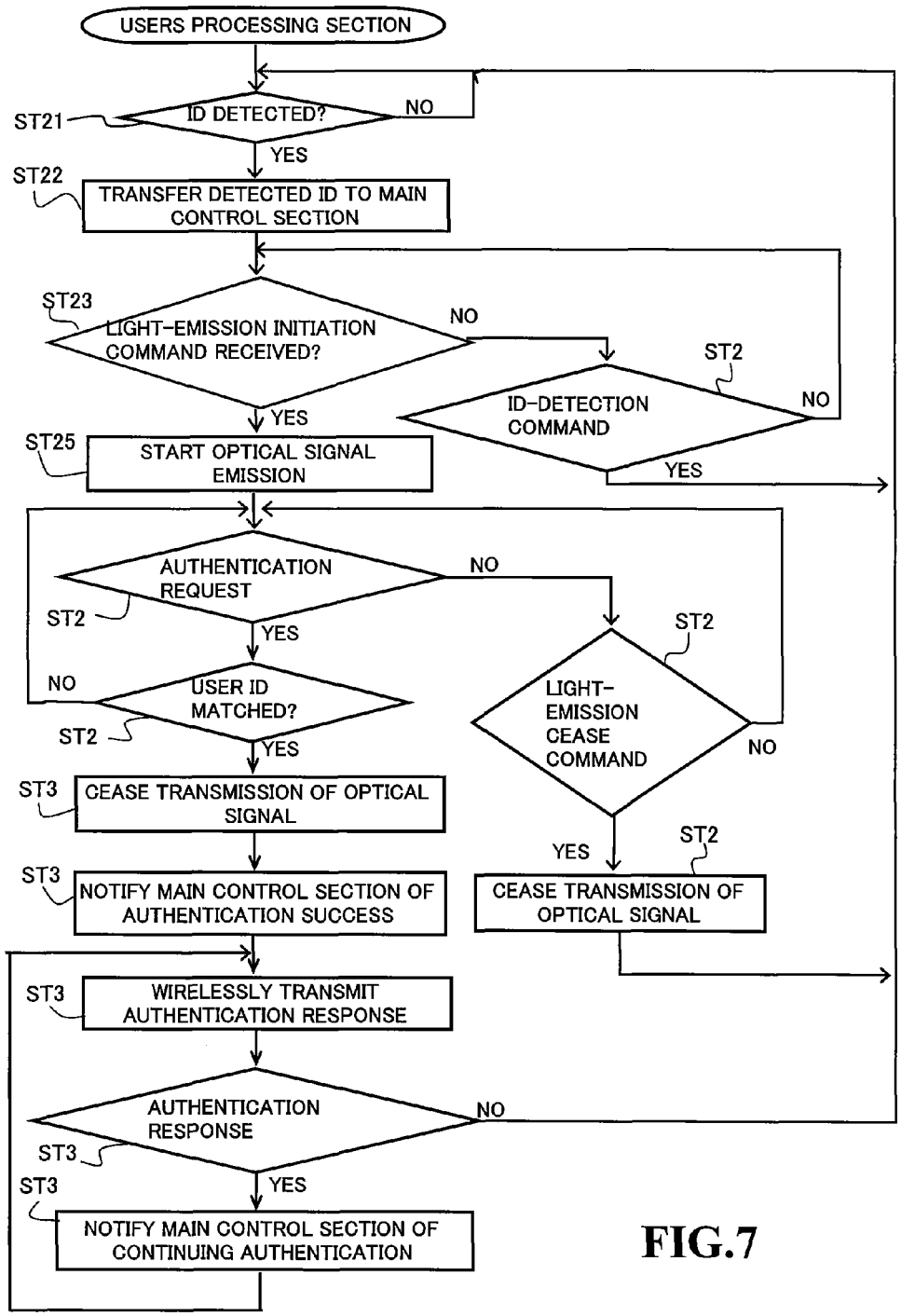
FIG. 7 is a flow chart illustrating the main-flow procedure executed by a user recognition processing section of the device according to the embodiment of the present invention.

On the other hand, with the device 2 initiated, user recognition processing section 25 commences operations of the procedure illustrated in the flowchart in FIG. 7. First, in ST21, user recognition processing section 25 waits for a user ID of RFID module 4 being detected by reader/writer 5.

Reader/writer 5 periodically emits a radiowave for an inquiry from an antenna 50. If any of RFID module 4 resides within the reachable communication area 51 of this radiowave, the relative RFID module 4 can receive the radiowave by its antenna 43.

Figure 8:
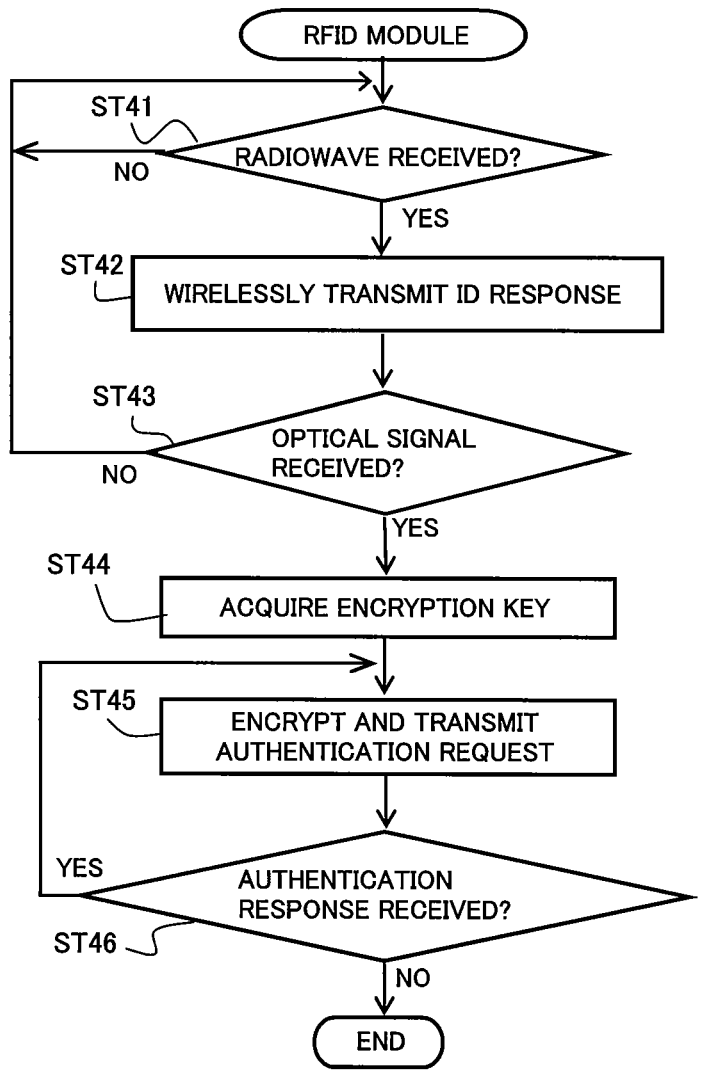
FIG. 8 is a flow chart illustrating the process procedure executed by a CPU of the RFID module according to the embodiment of the present invention.

Referring to FIG. 8, upon receipt of the radiowave of the inquiry from reader/writer 5 (YES, in ST41), RFID module 4 reads out its user ID from memory 442. Then, RFID module 4 converts an ID response signal containing this user ID into a radiowave and wirelessly transmits it from antenna 43 (ST42).

The radiowave of the ID response signal emitted from antenna 43 of the RFID module 4 is received by reader/writer 5 of the transmission source of the inquiry. If more than one RFID module 4 reside within wireless communication area 51, each of the corresponding RFID modules 4 emits a radiowave of the respective ID response signal from the respective RFID module 4. Reader/writer 5 has a collision preventative function called "anti-collision," by which reader/writer 5 is enabled to collectively receive the radiowave representative of all signals emitted from the respective RFID modules 4.

Reader/writer 5 then detects user IDs of the respective RFID modules 4 from all the ID response signals received by antenna 50. The detected one or more user IDs are handed to user recognition processing section 25.

Having received the one or more user IDs detected by reader/writer 5 (YES, in ST21), user recognition processing section 25 transfers the one or more user IDs to main-control section 21 in ST22.

Herein, the operation inhibition flag is set in ST4, and main-control section 21 waits for the user IDs being sent from user recognition processing section 25 in a state that inputting from the input section is inhibited in ST5. When the one or more user IDs are sent thereto (YES, in ST5), main-control section 21 stores all the user IDs in storage section 22 in ST6. If any of previously received user ID is stored in storage section 22, that user ID is cleared before the presently user IDs are newly stored. Accordingly, storage section 22 always stores user IDs of all the RFID modules 4 responded to a latest inquiry radiowave.

When the one or more user IDs are received from user recognition processing section 25, main-control section 21 searches the aforementioned schedule data file with the current clock-time kept in time-keeping section 23 as a search key in ST7. When the schedule data associated with the current clock-time as an occupying time zone is detected, a user ID corresponding to that particular data is acquired. Where more than one schedule data associated with the same occupying time zone of that current clock-time are detected, all the user IDs are acquired from the respective schedule data.

Main-control section 21 determines whether the user ID having reserved the current clock-time as its occupying time zone has been acquired or not in ST8. If not acquired (NO, in ST8), main-control section 21 proceeds to the operation of ST10. In ST10, main-control section 21 sends an ID detection command to user recognition processing section 25. Thereafter, the flow returning to ST5, main-control section 21 waits for a user ID of RFID module 4 responded to a new inquiry radiowave to be sent therein. Such an event (ST8->ST10->ST5) occurs when no data associated with the current clock-time as an occupying time zone is registered in schedule database 8.

In the case that more than one user ID having reserved the current clock-time as the occupying time zone could be acquired (YES, in ST8), main-control section 21 determines in ST9 if any of the user IDs acquired are included in the user ID list stored in the process of ST6 (ID determination means). That is, a first ID acquired in ST9 is compared with a second user ID (ID in the user ID list) stored in the process of ST6 to determine whether the first ID is included in the second ID.

If not included (NO, in ST9), the flow proceeds to ST10. That is, after sending an ID detection command to user recognition processing section 25, main-control section 21 waits for notification of another user ID of RFID module 4 responded to the new inquiry radiowave. Such an event (ST8->ST9->ST10->ST5) occurs in the case where, although a schedule data associated with the current clock-time as the occupying time zone of device 2 is registered, no such a user who is authorized to use that particular schedule data exists within wireless communication area 51 of the relative device 2.

In the case that a user ID of a schedule data associated with the current clock-time as the occupying time zone of the relative device 2 is included in the user ID stored in the process of ST6 (YES, in ST9), main-control section 21 informs user recognition processing section 25 of the included user ID together with a light-emission initiation command in ST11. Such an event (ST8->ST9->ST11) occurs in the case that a user authorized to use the relative device 2 including the schedule data associated with the current clock-time as the occupying time zone of the relative device 2 (hereinafter, referred to as an "authorized user") enters wireless communication area 51 of the relative device 2.

User recognition processing section 25, which has transferred the user ID detected by reader/writer 5 in ST22 to main-control section 21, waits for a command from main-control section 21 in ST23 or in ST24. When having received the ID detection command (YES, in ST24), user recognition processing section 25 waits for a new user ID to be detected by reader/writer 5, the flow returning to ST21.

The above-mentioned ID detection command is output when no schedule data associated with the current clock-time as the occupying time zone of the relative device 2 is registered, or in the case that, although such a data is registered, no such users corresponding to that schedule data exist within wireless communication area 51. In this case, user recognition processing section 25 controls reader/writer 5 to reiterate the process of searching for the user ID in a non-contact manner from RFID modules 4 residing within that wireless communication area 51.

If the command from main-control section 21 is not the ID detection command but the light-emission initiation command (YES, in ST23), user recognition processing section 25 instructs a light-emission driver 27 to commence emission of an optical signal (ST25), while holding the user ID informed together with the relative command (control means). As a result, a pulse signal is repetitively output from light-emission driver 27 so that light emitter 6 intermittently emits light.

The above-mentioned light-emission initiation command is output in the case that the schedule data associated with the current clock-time as the occupying time zone of the relative device 2 is registered, and a user corresponding to that schedule data exists within the relative wireless communication area 51. In this case, user recognition processing section 25 controls light emitter 6 to emit light therefrom. Accordingly, the process of detecting the user ID of RFID module 4 existing within the relative wireless communication area 51 is repetitively executed until the user authorized to use the relative device 2 at the current clock-time enters wireless communication area 51 of the relative device 2. When the user authorized to use the relative device enters wireless communication area 51 of the relative device 2, light emitter 6 of the relative device 2 starts to emit light.

The light from light emitter 6 can be received by photoreceptor 41 of RFID module 4. Upon receipt of the light by photoreceptor 41, the optical signal is input to CPU 441 from photo-reception controller 445 within RFID module 4.

In ST42, CPU 441 of RFID module 4 that wirelessly transmitted an ID response signal checks in ST 43 whether or not the optical signal is received from the relative devise 2. If the optical signal is not received (NO, in ST 43), RFID module 4 waits for a following inquiry radiowave (ST41). If the optical signal is received (YES, in ST 43), CPU 441 acquires an encryption key from the memory in ST 44. Then, CPU 441 encrypts an authentication request command using the encryption key and wirelessly transmits it to the relative devise 2 in ST 45 (authentication request means).

When a person carrying RFID module 4 by attaching it to, e.g., his/her chest enters optical communication area 61 of the relative device 2, photoreceptor 41 provided in RFID module 4 receives light from light emitter 6. Upon receipt of the light, RFID module 4 equipped with that photoreceptor 41 wirelessly transmits the authentication request command to the relative devise 2. The authentication request command contains a user ID stored in memory 442. The authentication request command is then received by reader/writer 5. The authentication request command received by reader/writer 5 is sent to user recognition processing section 25.

User recognition processing section 25 of the relative devise 2) instructed the initiation of the emission of the optical signal in ST25 waits for the authentication request command from the ID module in ST26. If user recognition processing section 25 receives a light-emission stop command from main-control section 21 during the stand-by for this command in ST 27, user recognition processing section 25 instructs light-emission driver 27 to stop emission of the optical signal in ST 28 (control means). As a result, the pulse signal output from light-emission driver 27 ceases and the light emission from light emitter 6 stops. Thereafter, the flow returns to ST21, where user recognition processing section 25 waits for a new user ID to be detected.

If user recognition processing section 25 has received the authentication request command from reader/writer 5 (YES, in ST26), user recognition processing section 25 acquires a user ID contained in the command in ST 29. Then, a determination is made whether this user ID conforms to the user ID provided by main-control section 21 together with the light-emission initiation command (authentication means). If the two user IDs are not matched to each other (NO, ST29), the flow returns ST 26 so that user recognition processing section 25 waits for a following authentication request command. This event (ST26->ST29->ST26) occurs when a holder of RFID module 4 having entered optical communication area 61 of the relative device 2 is not the authorized user.

On the contrary, if the two user IDs are matched to each other (YES, ST29), user recognition processing section 25 instructs light-emission driver 27 to stop light-emission in ST30. User recognition processing section 25 also sends an authentication success command to main-control section 21 in ST31. Furthermore, user recognition processing section 25 wirelessly transmits an authentication response command to RFID module 4 of the sender of the authentication request command in ST32.

Therefore, in the case where a holder of RFID module 4 enters optical communication area 61 of device 2 is the authorized user, light emission from light emitter 6 ceases its emission. Then, the authentication success command is sent to main-control section 21. Furthermore, the authentication response command is sent to RFID module 4 of the sender of the authentication request command. If RFID module 4 of the sender of the authentication request command still remains in wireless communication area 51, the above authentication response command is received by the corresponding RFID module 4.

CPU 441 of RFID module 4 that has wirelessly transmits the authentication request command in ST 45 waits for the authentication response command from the relative device 2 in ST 46. Having received the authentication response command from reader/writer 5 of the relative device 2 (YES, in ST46), the flow returns to ST45, wherein CPU 441 wirelessly transmits the encrypted authentication request command again. Thereafter, every time CPU 441 receives the authentication response command, CPU 441 reiterates the process of wirelessly transmitting the encrypted authentication request command. When CPU 441 receives no more of the authentication response command (NO, in ST46), CPU 441 terminates the process.

On the other hand, after wirelessly transmitting the authentication response command in ST32, user recognition processing section 25 of the relative device 2 waits for the authentication request command being returned from RFID module 4 of the destination of the authentication response command in ST33. Having received the authentication request command within a predetermined time (YES, in ST33), user recognition processing section 25 notifies main-control section 21 of the authentication continuation command in ST34. Furthermore, the flow returns to ST32 for user recognition processing section 25 to wirelessly transmit the authentication response command to that RFID module 4 again. Thereafter, every time user recognition processing section 25 receives the authentication request command from RFID module 4, it reiterates processes of notifying the authentication continuation command to main-control section 21 and wirelessly transmitting the authentication response command to that RFID module 4. These processes are made to continue until no more of the authentication response command is received (NO, in ST33). Then, the flow returns to ST 21, wherein user recognition processing section 25 waits a new user ID being detected by reader/writer 5.

Accordingly, after the authorized user enters optical communication area 61 of the relative device 2 and photoreceptor 41 of RFID module 4 carried by that user has received the light from light emitter 6, the authentication request command is repeatedly wirelessly transmitted from RFID module 4 owned by that user while that user stays within wireless communication area 51 of the relative device 2. In response to this request command, the authentication response command is repeatedly wirelessly transmitted from reader/writer 5.

Main-control section 21 notified user recognition processing section 25 of the light-emission initiation command in ST11 waits for the authentication success command being sent from user recognition processing section 25 in ST12. Herein, if a prespecified time T has elapsed without authentication success command being sent from user recognition processing section 25 after the notification of the light-emission initiation command in ST13, main-control section 21 notifies user recognition processing section 25 of the light-emission stop command in ST14. Subsequently, with the flow returning to ST5, main-control section 21 waits for a new user ID of RFID module 4 in response to a new inquiry waveform in ST1. This event (ST12->ST13->ST14->ST5) occurs when an authorized user enters wireless communication area 51 of that relative device 2 but not optical communication area 61.

If the authentication success command is received after the notification of the light-emission initiation command but before the prespecified time elapses, main-control section 21 resets the operation inhibition flag in ST 15. Consequently, in the relative device 2, the state of input inhibition from the input section including keyboard 28, pointing device, scanner, and touch panel is released (use-authorization means). Therefore, when an authorized user enters optical communication area 61 of the relative device 2 and photoreceptor 41 of RFID module 4 carried by this user receives light from light emitter 6, the state of input inhibition of the relative device 2 is released.

Thereafter, main-control section 21 executes the prescribed process based on information input from the input section in ST16. During the execution of this process, main-control section 21 determines if the authentication continuation command is periodically sent in from user recognition processing section 25 in ST17. While this command is being received therefrom (YES, in ST17), main-control section 21 continues the process. If the operation command discontinues (NO, in ST17), the process returns to ST4, wherein main-control section 21 sets the operation inhibition flag. Consequently, inputting from the input section in the relative device 2 is inhibited. (input inhibition means).

Thus, in this embodiment, the schedule data containing one or more user IDs and occupying time zones of the users who reserved use of the relative device 2 are stored in storage section 22 of the relative device 2. In this state, when a user carrying RFID module 4 enters wireless communication area 51 of the relative device 2, that user's ID stored in the corresponding RFID module 4 is detected by reader/writer 5 of the relative device 2.

Upon the detection of that user's ID, a determination is made whether or not this user's ID conforms to an ID of a user having reserved the schedule data associated with the current clock-time to be occupying time. If the two IDs are matched to each other, light emitter 6 provided on its operation panel of the relative device 2 initiates to emit light. This user ID is retained in user recognition processing section 25 of the relative device 2.

Thus, when the authorized user, who is authorized to use the relative device 2 by the schedule data associated with the current clock-time as being his/her occupying time zone of the relative device 2, enters wireless communication area 51 of the relative device 2 carrying his/her own RFID module 4, light emitter 6 of the relative device 2 starts to emit light. At this point, the operation inhibition flag of the relative device 2 is set on, and therefore inputting from the input section of the device is inhibited.

Thereafter, when this authorized user enters optical communication area 61 of the relative device 2, the light from light emitter 6 is received by photoreceptor 41 of RFID module 4 carried by this authorized user. Then, the authentication request command from the relative RFID module 4 is encrypted and wirelessly transmitted to the relative device 2. This authentication request command is then received by reader/writer 5 of the relative device 2. In this case, the user ID contained in the authentication request command conforms to the user ID retained in user recognition processing section 25. As a result, an authentication success command is sent from user recognition processing section 25 to main-control section 21. The operation inhibition flag of the relative device 2 is reset.

On the other hand, if the user ID of RFID module 4 carried by the user who entered optical communication area 61 of the relative device 2 does not conform to the user ID in the schedule data associated with the current clock-time to be scheduled occupying time zone of the relative device 2, the state of the input inhibition is not released.

Thus, when the authorized user approaches to the relative device 2 to operate that device, the state of the input inhibition is automatically released. Contrary to this, when any person other than the authorized user approaches to the relative device 2, the state of the input inhibition is not released. Accordingly, the authorized user can operate the relative device 2 without the needs of doing any particular operation to release the state of the input inhibition, while the operation of the relative device 2 by any person other than the authorized user is inhibited.

Incidentally, as to the relative device 2 whose input inhibition is once released, as long as the user remains within wireless communication area 51, the release of the input inhibition remains effective even when that authorized user exits from that optical communication area 61. Accordingly, since the use of the relative device 2 cannot be inhibited when the authorized user departs only a little from the relative device 2, the convenience of the users cannot be impaired.

In the meantime, if the authorized user exits within wireless communication area 51, the relative device 2 immediately becomes in the state of the input inhibition. In this way, the possibility of use of the relative device 2 by unspecified persons can be excluded at a high rate without the needs of special operation being performed by the authorized user to inhibit the inputting of the relative device 2, and therefore, a high security effect can be achieved.

Figure 9:
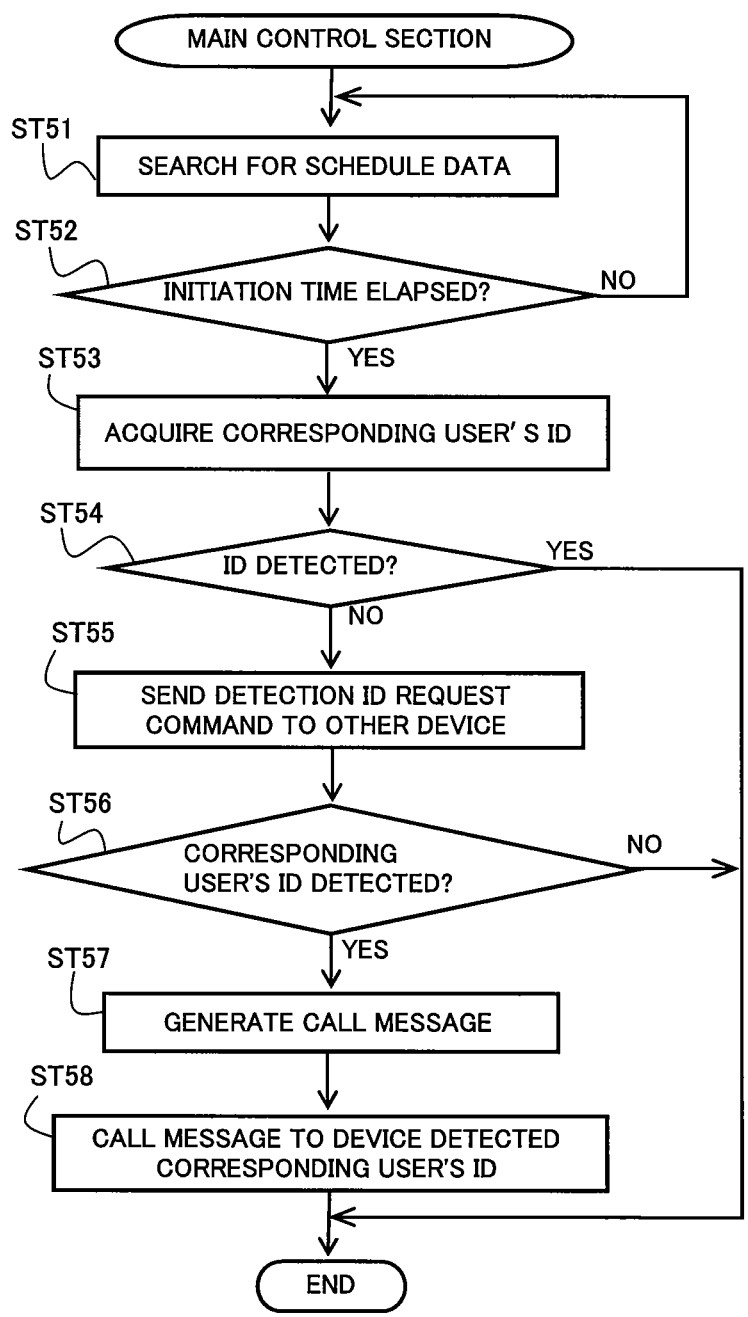
FIG. 9 is a view showing the process procedure of a sub-routine executed by a main controller of the device according to another embodiment of the present invention.
Figure 10:
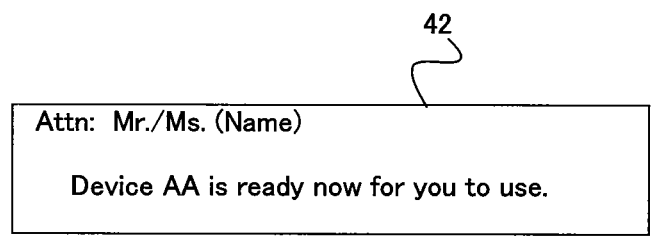
FIG. 10 is a view showing an example of a message data displayed on a message display section of the RFID module according to another embodiment of the present invention.

Now, a second embodiment will be described in reference to FIGS. 9 and 10. In this embodiment, if an authorized user who is authorized to use a certain device 2 at the current clock-time according to the scheduled data related to that device 2 is not within wireless communication area 51 of that device 2, a check is made to see if such user is within wireless communication area 51 of other device 2. If such user is within wireless communication area 51 of other device 2, a call is made using RFID module 4.

Since the hardware structure of this embodiment is identical to that of the first embodiment, the description therefor will be omitted here and only the use is made of FIGS. 1-5. Also, since the basic operations of main-control section 21, user recognition processing section 25, and ID module 4 are similar to those of the first embodiment, their descriptions will be omitted here and only the use is made of FIGS. 6-8.

The difference between the second embodiment and the first embodiment is the process of a subroutine executed by main-control section 21 of the device 2. FIG. 9 illustrates the process of this subroutine. Referring to FIG. 9, main-control section 21 periodically searches the schedule data file (ST51), and determines whether the schedule data associated with the current clock-time presented in time-keeping section 23 as the occupying time zone is present or not (ST52).

When the schedule data associated with the current clock-time as the occupying time zone is detected (YES, in ST52), main-control section 21 acquires a user ID from the schedule data (ST53). Then, a determination is made whether or not the acquired user ID exists among the user IDs stored in storage section 22, that is, user IDs of RFID module 4 detected by reader/writer 5 (ST54: verification means). If such user ID is found in storage section 22 (YES, in ST54), (the determination is made that) the user carrying RFID module 4 storing the user ID associated with the current clock-time reserved as the occupying time zone exists within wireless communication area 51 of the relative device 2. In this case, main-control section 21 terminates the current process.

On the other hand, if such user ID is not found in the storage section 21 (NO, ST54), the determination is made that the authorized user in question does not exist within wireless communication area 51 of the relative device 2. In this case, main-control section 21 transmits the detection ID request command to other device 2 connected to the relative device 2, e.g. device 2A via communication line 1. This detection ID request command is transmitted to other device 2, e.g. device 2B via communication line 1. Main-control section 21 of other device 2B that received this detection ID request command reads user IDs stored in its storage section 22 and transmits them to the device 2A of the transmission source of the detection ID request command. The user IDs stored in the storage section 22 are all the user IDs responded to the latest inquiry radiowave. That is, they are all the user IDs of users residing within wireless communication area 51 of the other device 2B. These user IDs are sent from communication section 24 of the other device 2B to the relative device 2A of the transmission source of the detection ID request command via communication line 1.

Main-control section 21 of the relative device 2A that transmitted the detection ID request command in ST55 searches user IDs sent from other device 2B. Then, a determination is made whether or not any ID conforming to the user ID acquired from the schedule data associated with the current clock-time as occupying time zone (ST56: searching means). If any corresponding ID is not found (NO, in ST56), the determination is made that the authorized user does not exist within wireless communication areas 51 of any devices 2. In this case, main-control section 21 (of the relative device 2A) terminates the current process.

On the contrary, if the corresponding ID is found (YES, in ST56), the determination is made that the authorized user exists within wireless communication areas 51 of device 2B of the transmission source that sent the corresponding user ID. In this case, main-control section 21 generates a message to call the authorized user (ST57). The message is sent to device 2B that has detected the user ID of the corresponding authorized user via communication line 1 (call-command means). This message data contains the user ID of the authorized user.

This message data is transmitted from its communication section 24 to the corresponding device 2B via communication line 1. Main-control section 21 of the corresponding device 2B received this message data converts the message data into a radiowave, which is then transmitted from antenna 50 of reader/writer 5 of the corresponding device 2B. The radiowave of this message data is received by RFID module 4 storing the particular user ID contained in the data. This message data is displayed on message display section 42 of RFID module 4 that received the message data (annunciation means). FIG. 10 shows an example of a display of the above message data. An authorized user seeing this message data notices that the use of the relative device 2A is now authorized.

Subsequently, the operations after this authorized user enters wireless communication area 51 of the relative device 2 and further wireless communication area 51 are the same as described in the first embodiment.

Thus, according to the second embodiment, the user authorized by the schedule data can be easily lead into the applicable device 2 based on the schedule data that has been provided previously.

This invention is not limited to the embodiments as described above, but invention can be embodied by modifying the constituents of the invention at the stage of the implementation without departing from the scope and the spirit of the invention.

For example, in the process of ST54 described in the second embodiment, when the determination was made that the acquired user ID did not exist within the user IDs stored in storage section 22 (NO, in ST54), the current process terminated. However, the process of this case may be altered such that the flow proceeds to the operation of generating a call message in ST57, wherein such message data is displayed in RFID module 4 of the user identified by the corresponding user ID.

In addition, in the second embodiment the notification was made by displaying a call message on message display section 42 of RFID module 4. The annunciation means need not be limited to such display means. Instead, other display means such as switching-on/off of a call lamp, or an annunciation means using a voice may be applied as well.

In the above first and second embodiments, the descriptions were made of the transmitting means by infrared light. The transmitting means need not be limited to such means. For example, other optical communication method or a short distance wireless communication method may be employed instead. What is required here is that an applicable transmitter transmits a signal receivable by RFID module 4 within an area in vicinity of the relative device narrower than the wireless communication area provided by the wireless communication means.

Various inventions can be formed by appropriately combining several components disclosed in the embodiments. For example, some of the components disclosed in the embodiments may be removed, or some components in other embodiment may be combined.

Numerous modifications and variations of the present invention are possible in light of the above teachings. It is therefore to be understood that, within the scope of the appended claims, the present invention can be practiced in a manner other than as specifically described therein.

What is claimed is:

1. A system for restricting use of a device to a user carrying an RFID module, said device comprising:
    wireless communication means for performing wireless communication with the RFID module in a non-contact manner when the RFID module is within a wireless communication area of the device, wherein the wireless communication means is attached to said device;
    a light emitter attached to an operation panel that faces an operator of the device, for emitting light to transmit a signal receivable by the RFID module which is within an optical communication area of the light emitter, the optical communication area of the light emitter being narrower than the wireless communication area, being included within the wireless communication area, and a size of the optical communication area being substantially the same as a size of an operation area of the device;
    authorization ID storage means for storing an ID of the RFID module;
    ID determining means for determining whether the ID of the RFID module within the wireless communication area has been stored by the authorization ID storage means;
    control means for controlling initiation of the signal transmission by the light emitter on the condition that the ID of the RFID module is determined by the ID determining means as having been stored;
    authentication means, when having received an authentication request signal containing the ID of the RFID module from the RFID module through the wireless communication means, for authenticating that the ID contained in the authentication request signal is the ID that is determined by the ID determining means as having been stored; and
    use authorization means for authorizing the use of the device on the condition that the ID contained in the authentication request signal is the ID that is determined by the ID determining means as having been stored and for keeping the state of the use authorization so long as the RFID module remains within the wireless communication area,
    wherein the RFID module comprises:
    a photoreceptor for receiving a signal from the light emitter when the RFID module is within the optical communication area of the light emitter; and
    authentication request means for wirelessly transmitting an RF signal containing the authentication request signal in response to the reception of the signal by the photoreceptor.

2. The system according to claim 1, wherein, if the authentication request signal is not received within a predetermined time after the control means controls the initiation of transmitting the signal, the control means controls the signal transmission to cease.

3. The system according to claim 1, wherein the authentication request means encrypts the authentication request signal prior to transmission thereof.

4. The system according to claim 1, the device further comprising time-keeping means for timekeeping a current clock-time, wherein the authorization ID storage means stores the ID of the RFID module together with a time period during which the user is authorized to use the device, and the ID determining means determines whether or not the ID of the RFID module is an ID of a user authorized to use the device at the current clock-time indicated by the time-keeping means.

5. The system according to claim 4, wherein the device is connected to one or more other devices through a network, the device further comprising:
    verification means for verifying that ID of the RFID module is an ID of a user authorized to use the device at the current clock-time indicated by the time-keeping means;
    search means, when the ID of the RFID module is not verified as the ID of the user authorized to use the device at the current clock-time indicated by the time-keeping means, for searching any device among the one or more other devices connected to the device through the network that is wirelessly communicating with the RFID module; and
    call command means, when the search means detects any device wirelessly communicating with the RFID module, for instructing said any device to transmit a call signal to the RFID module, wherein the RFID module further comprises annunciation means for performing an annunciation in response to the reception of the call signal.

6. The system according to claim 1, the device further comprising input inhibition means for inhibiting input from an input section, wherein the use authorization means releases a state of the input inhibition imposed by the input inhibition means.

7. The system according to claim 6, wherein when the RFID module enters the wireless communication area, the light emitter starts to emit and an input operation of said device remains inhibited.

8. The system according to claim 7, wherein when the RFID module enters the optical communication area of the light emitter and the use of said device is authorized, an inhibition of an input operation is released.

9. The system according to claim 8, wherein, when the inhibition of the input operation is released, so long as the RFID module remains within the wireless communication area, a release of the input operation remains effective.

10. The system according to claim 9, wherein when the RFID module exits the wireless communication area, the input of the operation is inhibited.

\* \* \* \* \*